United States Patent [19]
Dewing et al.

[11] Patent Number: 4,579,182
[45] Date of Patent: Apr. 1, 1986

[54] STEERABLE, TRACK-TYPE VEHICLE FOR BULKY LOADS

[75] Inventors: Kenneth F. Dewing; Donald C. Harlander, both of Benicia; Ralph O. Hughes, Walnut Creek, all of Calif.

[73] Assignee: McKay International Engineers, Benicia, Calif.

[21] Appl. No.: 427,043

[22] Filed: Feb. 28, 1983

[51] Int. Cl.[4] .............................................. B62D 11/20
[52] U.S. Cl. ..................................... 180/9.46; 280/111
[58] Field of Search ....................... 180/9.46, 9.44, 9.1, 180/9.5, 9.48; 280/28.5, 81 R, 81 A, 81 B, 95 R, 111; 172/258, 259, 260

[56] References Cited

U.S. PATENT DOCUMENTS

| | | | |
|---|---|---|---|
| 2,998,998 | 9/1961 | Hyler | 180/9.1 |
| 3,184,867 | 5/1965 | Symmank | 180/9.46 |
| 3,747,718 | 7/1973 | Gauchet | 280/81 A |
| 3,946,822 | 3/1976 | Dohse | 180/9.46 |
| 4,387,814 | 6/1983 | Beduhn | 180/9.46 |

FOREIGN PATENT DOCUMENTS

| | | | |
|---|---|---|---|
| 577301 | 5/1933 | Fed. Rep. of Germany | 180/9.1 |
| 304793 | 3/1930 | United Kingdom | 180/9.1 |

*Primary Examiner*—John A. Pekar
*Assistant Examiner*—Everett G. Diederiks, Jr.
*Attorney, Agent, or Firm*—Lothrop & West

[57] ABSTRACT

A steerable, track-type vehicle has a body at opposite ends resting on pairs of axles, each axle pair being interconnected by bolsters and bolster frames joined through rotatable joints to track frames equipped with ground-engaging grousers. There is steering mechanism for turning the tracks about the rotatable joints, and preferably there are driving wheels engaging and propelling the grousers.

4 Claims, 7 Drawing Figures

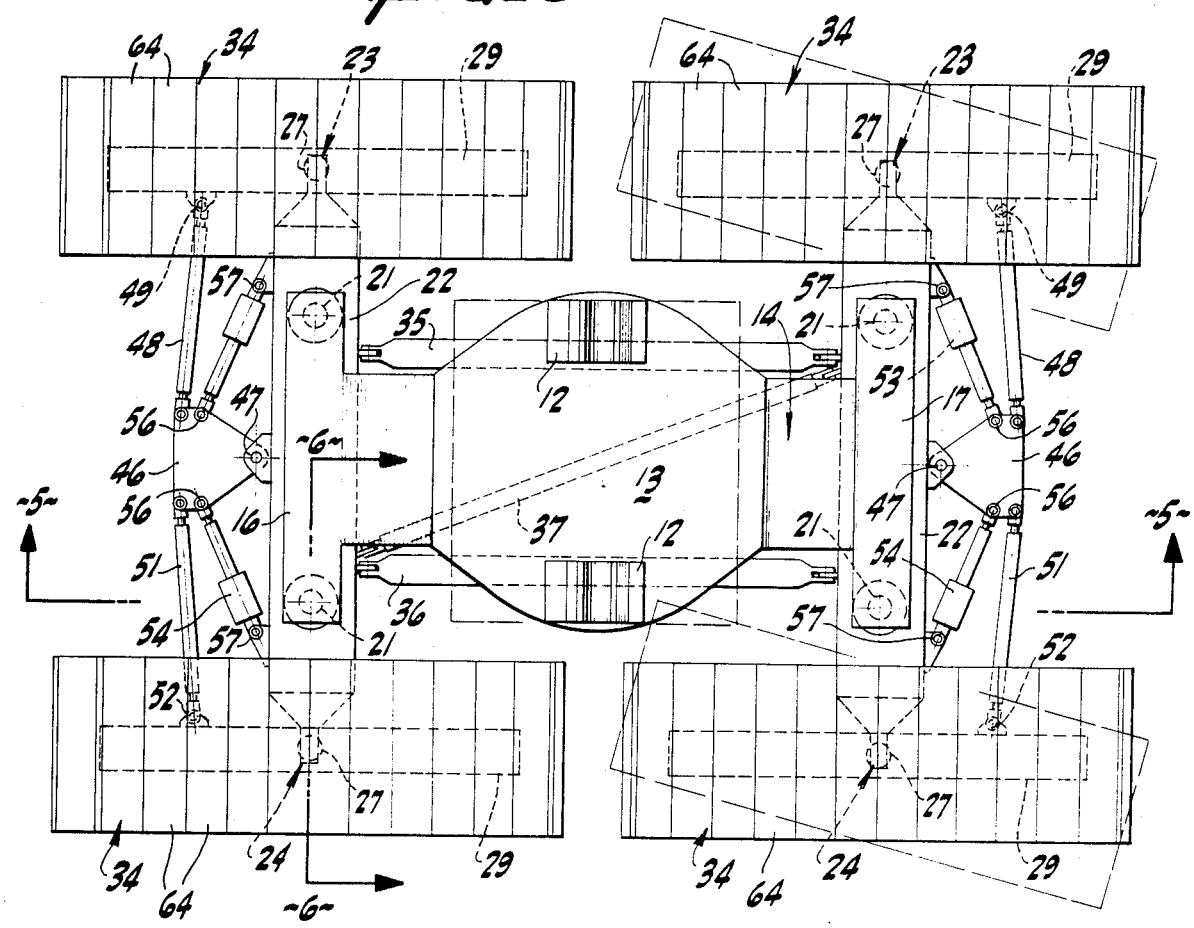
FIG_3
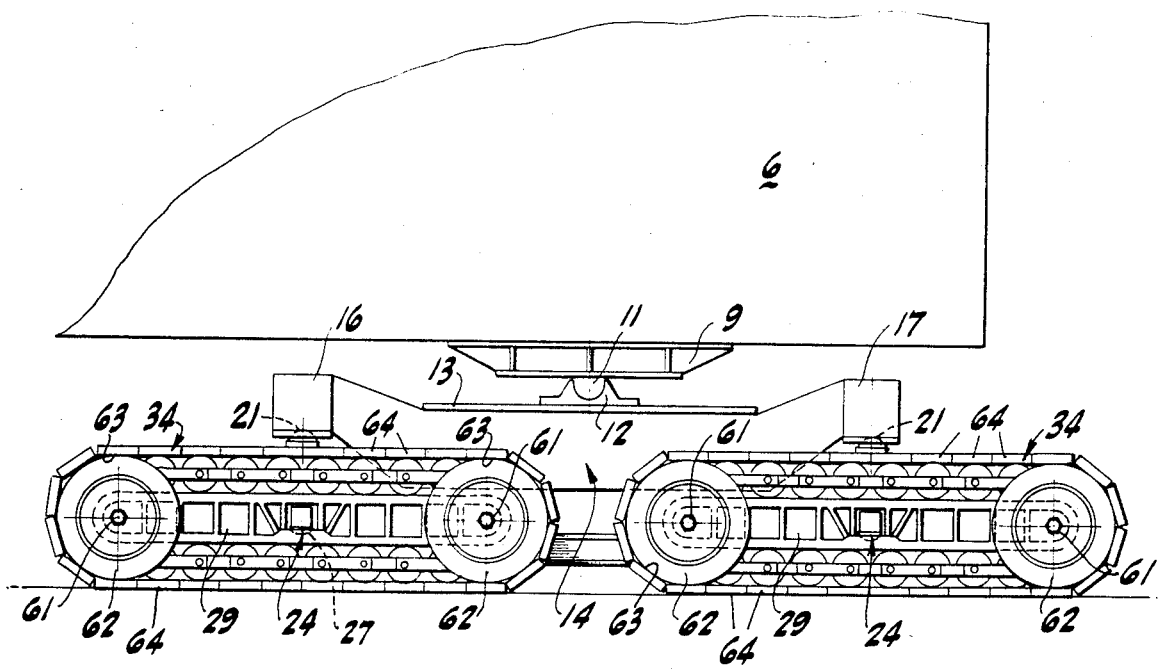
FIG_4

STEERABLE, TRACK-TYPE VEHICLE FOR BULKY LOADS

CROSS-REFERENCES TO RELATED APPLICATIONS

A related disclosure is in our co-pending patent application entitled "Heavy Transport Bolster Construction" filed Feb. 28, 1983, Ser. No. 427,044.

BRIEF SUMMARY OF THE INVENTION

A steerable, track-type vehicle usually for off-road use and for bulky and heavy loads has a relatively high and wide body generally rectangular in plan. The body is supported near each end thereof by several similar ground-engaging track plates on track frames. Each track frame has a ball or spherical cup in engagement with a spherical bearing near an individual axle beam end. Each beam near its axle end is joined to the end portions of a respective bolster frame through hydraulically expansible piston and chamber combinations. The track frames and their adjacent axle beams are provided with steering links so that the track frames can be pivoted about vertical axes with respect to the axle beams and the fore and aft bolsters. Track chains on the track frames can be provided with individual power drives.

BRIEF DESCRIPTION OF THE SEVERAL VIEWS OF THE DRAWINGS

FIG. 3 is a plan of a support and steering unit of the vehicle.

FIG. 4 is a side elevation with a portion broken away of the structure of FIG. 3.

DETAILED DESCRIPTION

Figure 1:
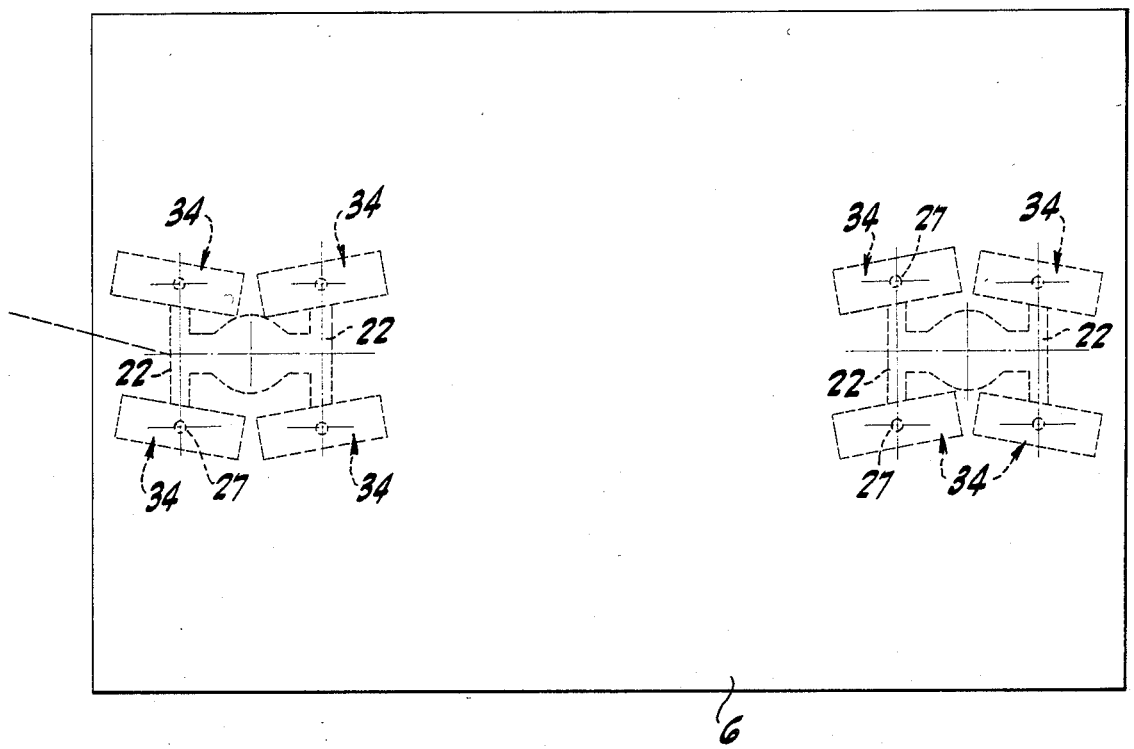
FIG. 1 is a plan of the steerable, track-type vehicle of the invention.
Figure 2:
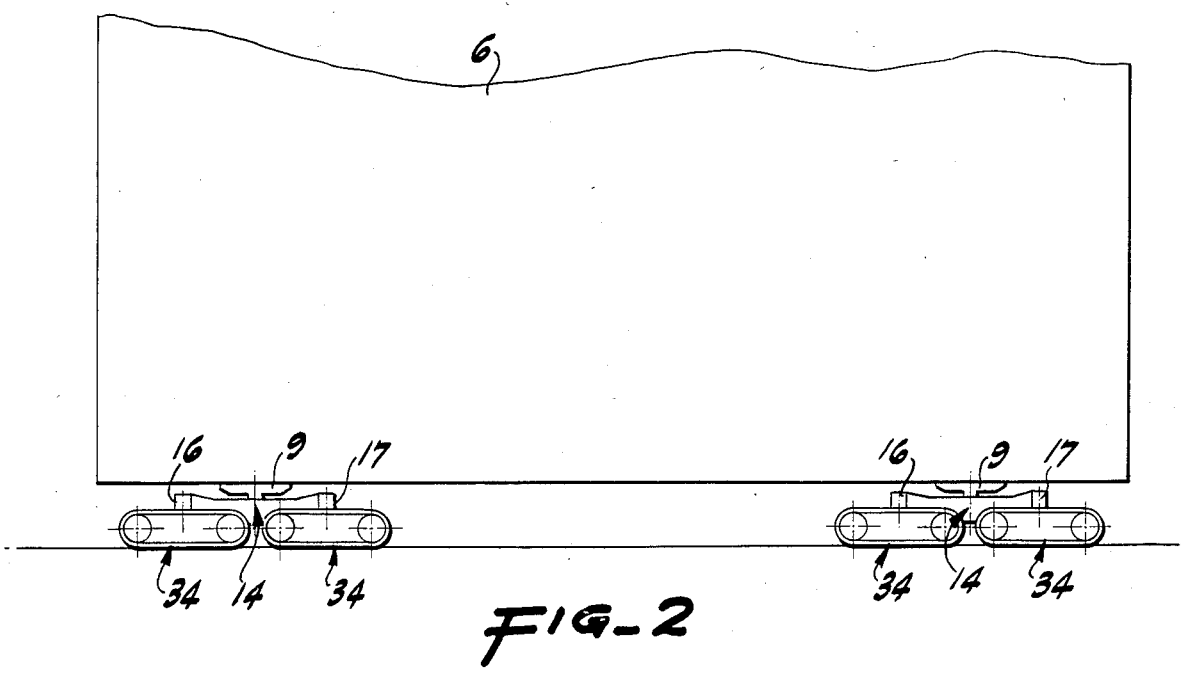
FIG. 2 is a side elevation with a portion broken away of the structure of FIG. 1.

The present arrangement is particularly designed for transporting unwieldly, bulky and heavy loads under primitive conditions, sometimes over rough pathways. As an example, the present devices are utilized, especially in Alaska, in connection with the transport of a carrying body or transport module substantially one hundred feet long, about sixty feet high, and approximately forty feed wide. The operating conditions vary substantially, particularly in arctic and sub-arctic areas, and there is often a cross wind factor involved. The container necessarily must travel reasonably smoothly even though heavily loaded. For example, a representative load is about twelve hundred tons.

The body 6 near its forward and rearward corners is supported by front and rear support and steering units each with a pair of laterally spaced tracks. The units have bottom sills 9 each provided with a half-round or semi-cylindrical bearing 11 resting in a receiving bearing socket 12 disposed centrally of a bolster plate 13 resting on a fore and aft bolster 14. At its ends, the bolster 14 is joined to a transverse front support bolster 16 and to a transverse rear support bolster 17. The ends of the transversely extending supports 16 and 17 are disposed on subjacent pistons 18 operating in hydraulic chambers 19, each piston and chamber forming a set and the connection preferably being through spherical joints 21.

The hydraulic chambers 19 are disposed near the respective ends of front and rear transversely extending axle beams 22. Each end of each one of the axle beam 22 has one of a pair of terminal axle blocks 23 and 24. Each of these blocks 23 and 24 near its center has a spherical bearing 27 resting in a spherical cup 28 on and near the middle of a longitudinally extending track frame 29. A track chain 30 has links 31 pivoted together and joining rollers 32 designed to run on the frame 29 and to support articulated, ground-engaging track plates 34 or grousers.

Figure 5:
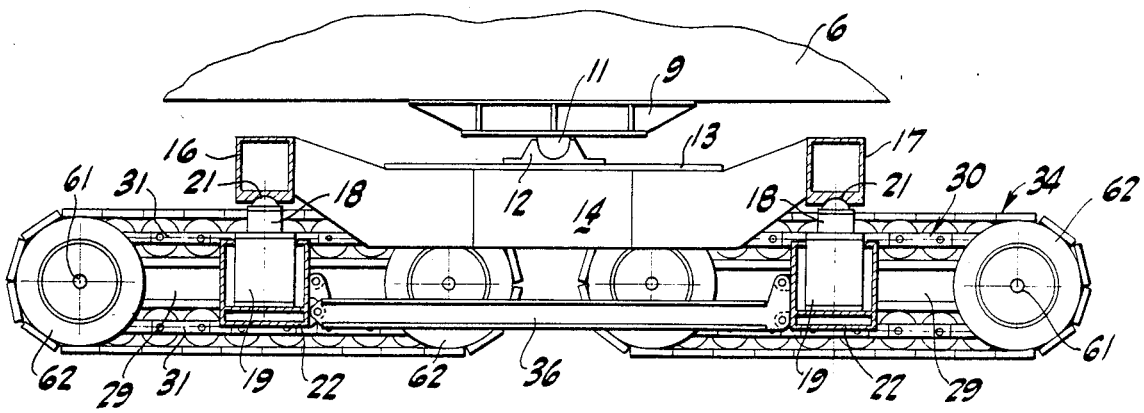
FIG. 5 is a cross-section, the plane of which is indicated by the line 5—5 of FIG. 3.

The front and rear axle beams 22 are maintained in a fore and aft spaced apart relationship. This is accomplished by longitudinally extending, laterally spaced apart struts 35, 36 and 37. At its rear end the strut 36 (see FIGS. 3 and 5) is joined by two pins to the rear axle beam 22, and at its front end the strut 36 is joined by a single pin to the front axle beam 22. Similarly, the strut 35 is joined at its front end to the front axle beam 22 by two pins and at its rear end is joined by one pin to the rear axle beam 22. The strut 37 extends diagonally and at its forward end is connected by a single pin to the front axle beam 22 and at its rearward end is joined by a single pin to the rear axle beam 22. In this way, a somewhat yielding but fairly accurate geometrical positioning is attained.

Since it is desired to steer the individual track plates 34 and track frames 29 with respect to the axle beams 22, each of the axle beams; for example, the axle beam 22 as shown in FIG. 3, carries a steering plate 46 joined to the central portion of the axle beam by a pivot pin 47 affording motion about a vertical axis. The plate 46 at one side has a steering link 48 joined to a steering pivot 49 on the adjacent track frame 29, whereas the other side of the plate 46 has a steering link 51 pivoted thereto and also joined by a pivot 52 to the adjacent track frame 29.

The steering plate 46 in addition has a pair of hydraulically expansible chambers 53 and 54 connected thereto by pivots 56 and that are also connected to the adjacent axle beam 22 by pivots 57. By appropriate manipulation of the hydraulic mechanisms 53 and 54, the steering plate 56 is pivoted about the pin 47, and the steering links 48 and 51 cause corresponding steering movement of the individual track frames 29 about their spherical bearings 27 as shown in dotted lines in FIGS. 3 and in FIG. 1.

The forward pair of ground-engaging track frames and the rearward pair of ground-engaging track frames can all be steered in the same way and in the same direction or can be steered in different directions, depending upon the desire of the operator and the maneuver to be accomplished.

The load is transmitted from the body 6 through the bottom sill 9 and through the individual cylindrical bearing connections 11 onto the bolster plates 13 and from there onto the fore and aft bolsters 14. From there the load goes through spherical joints 21 and through hydraulic pistons 18 and chambers 19 onto cross axle beams 22. Then the load goes from the ends of the axle beams 22 through other spherical bearings 27 and cups 28 onto the track frames 29 and the track links 31 to the supporting surface of the ground.

The arrangement is such that while there is substantial universality of movement so that undulations in the supporting ground or roadway can readily be accommodated without major transmission to the body or load, even so there is substantial lateral and longitudinal stability not only against dislodgment by the ground surfaces, but also against undue tipping by cross winds and the like. Furthermore, since there are several ground-engaging supports, preferably independently controlled, there is adequate maneuverability even though the load is bulky and heavy.

Figure 6:
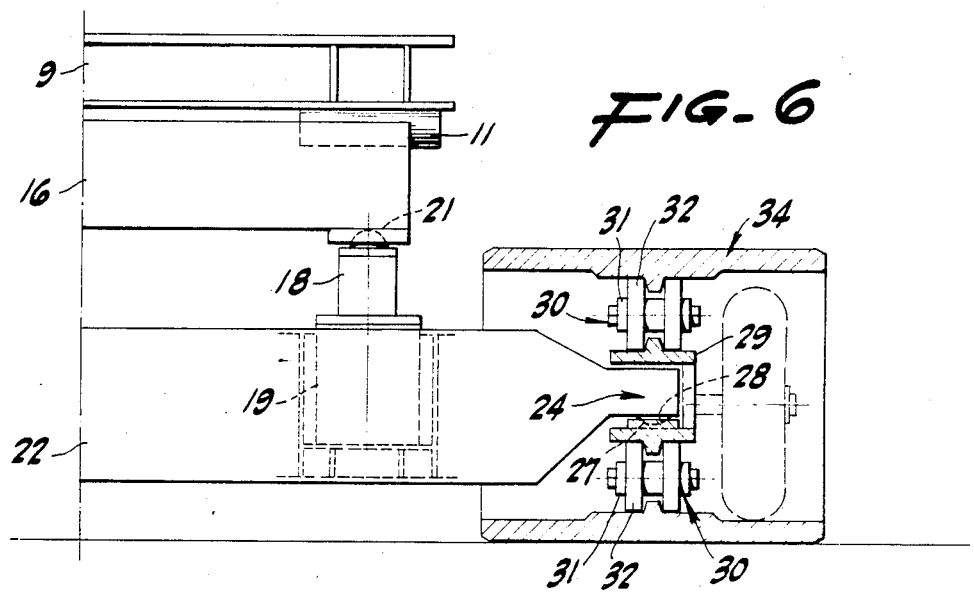
FIG. 6 is a cross-section, the plane of which is indicated by the line 6—6 of FIG. 3, an optional pneumatic tire structure being shown in broken lines.
Figure 7:
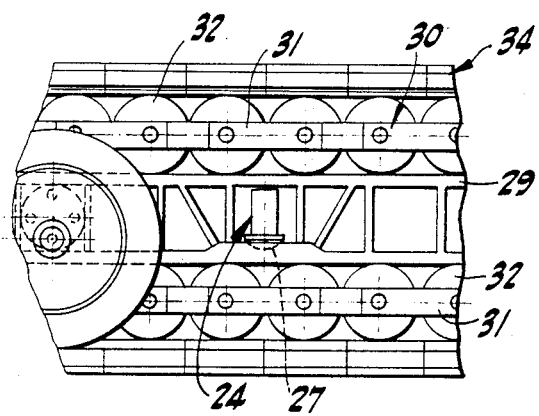
FIG. 7 is a detail in side elevation and with portions broken away of part of one of the track structures as shown in FIG. 4, the pneumatic tire structure being shown in full lines.

In most instances, the load is advanced by a tractor or tractors connected directly either to the front of the body or, more particularly, to the front of at least one of the ground-engaging units, but under some circumstances there is a power drive mechanism connected with the support structure. As particularly indicated in FIG. 4, the track frame 29 can carry drive shafts 61 in turn rotating rubber-tired wheels 62 in engagement with the inner surfaces 63 of the track links 64. As shown in FIGS. 6 and 7, the tire drive shaft can be offset so that the tire runs against only the inner surface 63 (FIG. 4) of the lower track links 64. The actuation for the drive comes from individual hydraulic motors (not shown) or mechanically by customary means and preferably includes change speed gearing and the like if necessary. It is evident that each of the track units can be individually propelled if necessary either forward or backward to avoid the use of a towing tractor or tractors.

In general, there has been provided mechanism for transporting a voluminous, heavy, awkward body over terrain that is undeveloped and is not particularly smooth and is able to do so without substantial danger of upset either by side winds or by undulations in the supporting surface.

We claim:

1. A steerable, track-type vehicle for bulky loads comprising a front unit including a forward pair of laterally spaced track units including track frames and a rearward pair of laterally spaced track units including track frames, a pair of transverse axle beams, each axle beam having spherical cup and bearing connectors to a respective one of said pair of said track frames, said connectors being disposed at the center of said track frame and at the ends of said axle beam for constraining said track frame to turn relative to said axle beam about a horizontal axis through said connector and about a vertical axis through said connector, a pair of transversely extending support bolsters each disposed above a respective one of said axle beams, transversely spaced expansible piston and chamber sets connected between each of said axle beams and a respective one of said support bolsters, fore and aft extending bolsters each joining one of said pairs of support bolsters, a body, and means for supporting said body on respective ones of said fore and aft bolsters for relative rocking motion of said body and said fore and aft bolsters about transverse axes.

2. A device as in claim 1 in which said expansible connectors and said axle beams are interconnected by spherical joints.

3. A device as in claim 1 including longitudinal struts interconnecting the axle beams of each of said pairs.

4. A device as in claim 3 including a diagonal strut interconnecting the axle beams of each of said pairs.

* * * * *